Patented June 1, 1943

2,320,598

UNITED STATES PATENT OFFICE 2,320,598

PROCESS FOR THE MANUFACTURE OF DISTILLABLE OILS FROM WOOD AND OTHER PLANT MATERIALS

Harold Hibbert and Archibald B. Cramer, Montreal, Quebec, Canada

No Drawing. Application December 14, 1938, Serial No. 245,706

1 Claim. (Cl. 260—124)

This invention relates to a low temperature process for the manufacture or extraction of useful products from wood and other lignin-containing materials; and it comprises subjecting such materials to the action of ethanol in the presence of a catalyst characterised by its ability to form hydrogen ions in aqueous solution; filtering the resulting solution; extracting the filtrate with an organic solvent such as ether or benzene; and treating the resulting ether or benzene extract to isolate certain high boiling liquid and/or crystalline products in a relatively pure form.

The high boiling liquid and/or crystalline products obtained in accordance with this invention have been identified as (1) an aldehydic constituent boiling at 130° to 150° C. at a low pressure of the order of 0.002 mm. of mercury; (2) phenolic substances boiling at approximately 130° to 150° C. at a pressure of the order of 0.005 mm. of mercury; and (3) a neutral substance boiling at 150° to 160° C. at a pressure of the order of 0.010 mm. of mercury. These products are recovered and isolated by well known methods and are useful in the manufacture of plastics and resins; as solvents, or as intermediates in the chemical industry and in various other relations.

Since most of the cellulose present in the material treated in accordance with this invention remains undissolved the new products obtained presumably arise from the "incrustants," namely, the lignin and/or hemicelluloses present in the original wood. Whether these products are present, as such, in the original wood cannot be stated with certainty since they may represent decomposition products of same.

The plant materials treated in accordance with this invention may consist of wood waste (preferably in the form of hog fuel, small wood chips, prunings, shavings and saw-dust) or plant materials such as corn cobs, corn stalks, flax stems, jute and other products. In one instance 500 gm. of spruce woodmeal were mixed with three litres of absolute ethanol containing two percent of anhydrous hydrochloric acid. This mixture was refluxed for a period of from twelve to forty-eight hours, and then filtered, the woodmeal residue being washed with hot ethanol and the wash added to the original ethanol extract. The combined solutions were then evaporated to a small volume, say 500 cc. and then added to three litres of water with stirring resulting in the separation of a dark brown precipitate, lignin in type. The aqueous ethanol solution and the precipitated lignin material were then separately extracted with ether and the extracts combined and evaporated to effect removal of the solvent. After removal of the solvent there was left a thick, viscous, dark colored liquid in a yield of approximately 10-20 per cent by weight of the original wood. The previously mentioned aldehydic, phenolic and neutral products were then separated from this liquid by well known processes ordinarily used in isolating similar substances.

Numerous modifications of the foregoing example are contemplated as falling within the scope and spirit of the invention. For example other catalysts, such as sulphuric acid and acid salts, products of the type of methyl hydrogen sulphate, acid phthalates, etc., may be employed in place of or in addition to hydrochloric acid. The temperature of the extraction may vary from normal room temperature up to 160° C. depending on the extractant used and the pressure employed. Instead of using reflux temperatures under normal pressure higher pressures may also be employed effectively. Benzene and other suitable organic solvents may also be used in place of ether for extracting the aqueous ethanol solution.

In the process described herein the alcohol or other hydroxylic solvent combines, in whole or in part, with the lignin constituents of the wood or other lignin-containing material. We are not able to explain the nature and effects of the reactions here involved but find that this step is essential to the formation and/or recovery of the high boiling point liquid and/or crystalline products previously referred to.

Having thus described our invention, what we claim is:

A process for converting lignin constituents of ligno-cellulose into distillable liquid and crystalline products comprising the following steps, (1) subjecting the ligno-cellulose to the action of absolute ethanol in the presence of a catalytic quantity of anhydrous hydrochloric acid for a period of from twelve to forty-eight hours; (2) filtering the resulting mixture; (3) washing the residue of Step (2) with a hot ethanol wash liquor and then adding the wash liquor to the filtrate; (4) evaporating the resulting combined solution to a small volume and then adding water thereto with sufficient agitation to effect the separation of a lignin precipitate; (5) separately extracting the aqueous ethanol solution and the lignin precipitate resulting from Step (4) and combining the two extracts; (6) evaporating the said combined extracts until the solvent is substantially removed and there is left a thick viscous liquid residue; and (7) fractionating said liquid residue to recover high boiling point liquid and crystalline products comprising (a) an aldehydic constituent boiling at 130 to 150° C. at a low pressure of the order of 0.002 m. of mercury; (b) a phenolic substance boiling at 130 to 150° C. at a pressure of the order of 0.005 mm. of mercury; and (c) a neutral substance boiling at 150 to 160° C. at a pressure of the order of 0.010 mm. of mercury.

HAROLD HIBBERT.
ARCHIBALD B. CRAMER.